(No Model.)

R. WOBUS.
EDUCATIONAL APPLIANCE FOR TEACHING READING AND NUMBERS.

No. 419,393. Patented Jan. 14, 1890.

Witnesses
Henry Ahlbrandt.
John H. Wright.

Reinhard Wobus, Inventor
By his Attorneys Herthel & Co.

UNITED STATES PATENT OFFICE.

REINHARD WOBUS, OF ST. CHARLES, MISSOURI.

EDUCATIONAL APPLIANCE FOR TEACHING READING AND NUMBERS.

SPECIFICATION forming part of Letters Patent No. 419,393, dated January 14, 1890.

Application filed August 19, 1889. Serial No. 321,274. (No model.)

*To all whom it may concern:*

Be it known that I, REINHARD WOBUS, a citizen of the United States, residing at St. Charles, in the county of St. Charles and State of Missouri, have invented a certain new and useful Improved Educational Appliance, of which the following is a specification.

My invention relates to a certain new and useful improved educational appliance; and it consists of a combined spelling-case and numeral-frame constructed in portable form, so that the same can be hung upon the walls of the school-room; and the object of my invention is, first, to provide a spelling-case with its interior divided into apartments for storing of card-tablets having printed letters and figures thereon and closed on its front by a sliding lid, said printed card-tablets being for the purpose of the exposition to pupils of English and German orthography and orthoepy; second, the combining of a numeral-frame on the one side of the front-closing sliding lid of the spelling-case for the purpose of teaching pupils the rudiments of arithmetic; also, metal shelves or receptacles for holding of the printed card-tablets on the reverse side for the purpose of conducting a spelling-lesson, so that on withdrawal of said front-closing sliding lid it can be mounted and adjusted on its case by the teacher to facilitate as desired the conducting of a numeral or spelling lesson. I accomplish these objects by the mechanism illustrated in the accompanying drawings, of which—

Figure 1:
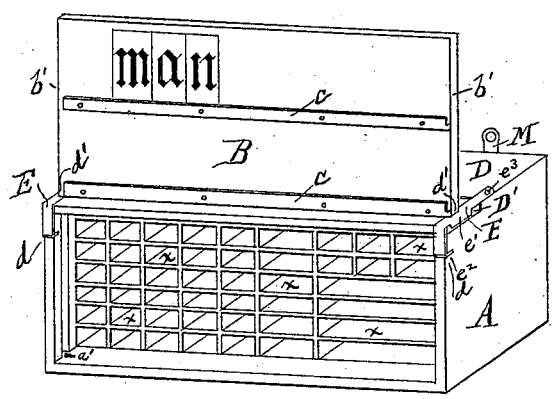
Figure 2:
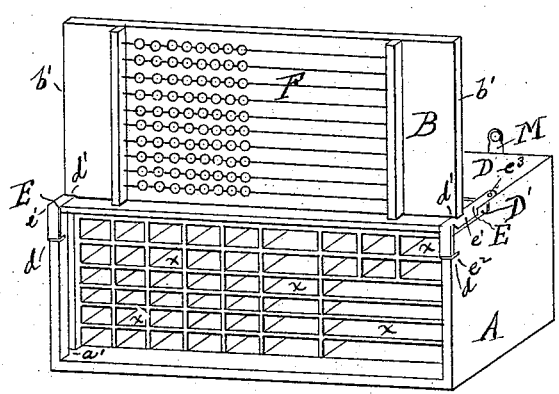
Figure 3:
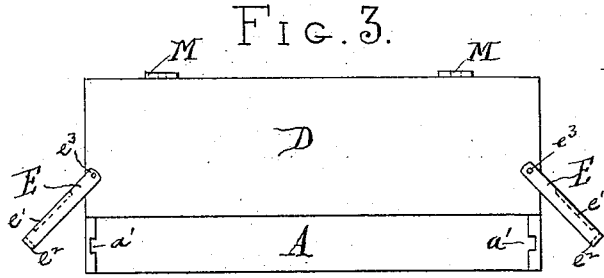
Figure 4:
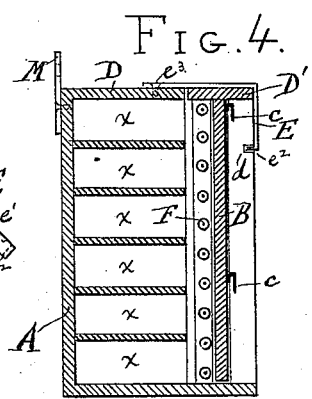

Figure 1 is a perspective view of my educational appliance hung up against the wall of a school-room, showing the case A, with front-closing sliding lid B adjusted on its case and exposing the metal shelves or receptacles for holding the printed card-tablets when the teacher is conducting a spelling-lesson. Fig. 2 is a similar perspective view of my educational appliance as it appears when the teacher has adjusted the front-closing sliding lid B on the case A and exposed the numeral-frame to view for the purpose of conducting a numeral-lesson. Fig. 3 is a top view, and Fig. 4 is an enlarged vertical section.

Similar letters of reference refer to similar parts throughout the several views.

A represents my portable spelling-case provided with the hooks M M, attached to back of same, by which the case can be hung up against the wall of the school-room.

B represents the front-closing sliding lid, which has the seating-piece D' attached to top part. (See Figs. 1, 2, and 4.) Said case A, I make in rectangular form, of wood, closed on the back and having a bottom, sides, and top, the said bottom and sides being made flush in front, and top piece D (see Fig. 3) being set back to provide a recess in front in order to permit the seating-piece D', attached to front-closing sliding lid B, to fall in said recess, said seating-piece D' then completing the top of the case when closed by the front sliding lid. (See Fig. 4.) Further, I utilize said closing sliding lid B by attaching a numeral-frame F to one side of same, (see Figs. 2 and 4,) which is constructed, as usual, of a series of wires strung with wooden balls for the conducting of a numeral-lesson. On the reverse side of said closing sliding lid B, I provide the shelves c c, which I place apart from each other for the purpose of holding the printed card-tablets in position as placed by the teacher in conducting a spelling-lesson, (see Figs. 1 and 4,) said shelves c c being metal strips secured by screws against the face of the sliding lid.

To close the case with the sliding lid B, I provide case A on the inside of the front and to both its vertical sides with the grooves a' a', (see Fig. 3,) thereby permitting the edges b' of the sliding lid B to fall into said grooves, and the seating-piece D', attached to the sliding lid B, to fall into its recess, as shown in Fig. 4.

The interior of the case A, I divide into large and small aprtments x x x, &c., (see Figs. 1, 2, and 4,) for storing of the series of card-tablets with printed letters and figures thereon, and which are to contain all small and capital letters, all marks and signs employed in reading and writing, all regular and occasional sounds of vowels, all dipthongal sounds, and all consonants, each apartment being lettered on its dividing partition by the particular letters and figures it is to contain.

In order to securely fasten the sliding lid B when withdrawn from the case A, and mounted, as shown in the perspective views, Figs. 1 and 2, for the purpose of conducting a spelling or numeral lesson by the teacher, I provide the case A on both its sides with the angle-clasps E E, (see Figs. 1, 2, and 3,) which I pivot to the top of the case at $e^3$ $e^3$, and also the sliding lid B with slots $d'$ $d'$ cut into both sides above the seating-piece D', said angle-clasps E E being formed out of a bent piece of metal having the side flange $e'$ to grasp the side of the case, and a front flange $e^2$, which passes into the slot $d$ cut into both vertical sides of the front edges of the case A, so that when the seating-piece D', which is attached to the sliding lid B, is placed within the top recess, as shown in Figs. 1 and 2, both the said angle-clasps E E, being movable and working on their pivots, are brought forward to pass into the slots $d'$ $d'$ of the sliding lid B, and thus by means of the flanges $e^2$, passing into the slots $d$, and the flanges $e'$, grasping the sides of the case, the said sliding lid is securely and firmly fastened. When it is desired to close the case with the sliding lid B, the said angle-clasps are similarly brought forward to secure the same, as shown in Fig. 4.

Having described the mechanical parts of my invention, I will now describe the advantages and use of same. With the aid of my educational appliance the teacher may explain by comparison, by contrast, and by analysis. It tends to teach the powers and uses of letters and marks by intuition, and it is especially useful in teaching pupils to read. For example, let the teacher place the letter "m" on the shelf of the case, (the pupil gives the sound,) the letter "a," (the pupil gives the sound of that letter,) the letter "n," (the pupil gives the sound of that letter,) and then combines the three different sounds, which gives the word "man." Suppose the difference between "ā" and "a" is to be explained. The word "fate" is placed on the shelf and pronounced. Then the "ā" is exchanged for "a" and the "e" for "her," and the pupil pronounces the word "father." In like manner all the different vowel sounds can be brought before the eyes of children.

What I claim, and desire to secure by Letters Patent, is—

1. In an educational appliance, the portable spelling-case A, having interior apartments $x$ $x$ for storing of the printed card-tablets, and provided with the recessed top piece D, grooves $a'$ $a'$, and pivoted angle-clasps E E, having the flanges $e'$ $e^2$, in combination with the sliding lid B, having seating-piece D', and slots $d$ $d$, as and for the purpose set forth.

2. In an educational appliance, the combination of the portable spelling-case A with the sliding lid B, its seating-piece D', the pivoted angle-clasps E E, having the flanges $e'$ $e^2$, by means of which it is held in position when mounted on case A, said sliding lid B having the numeral-frame F, attached to one side of the sliding lid, and on the reverse side the metal shelves or receptacles $c$ $c$, for holding the printed card-tablets, adapting said sliding lid B, when mounted on case A, to be utilized in either conducting a spelling or numeral lesson, as and for the purpose set forth.

REINHARD WOBUS.

Witnesses:
STEPHEN H. MERTEN,
AUGUST R. HUNING.